United States Patent
Miyoshi et al.

(10) Patent No.: US 9,850,368 B2
(45) Date of Patent: *Dec. 26, 2017

(54) CARBON FIBER COMPOSITE MATERIAL

(71) Applicant: Toray Industries, Inc., Tokyo (JP)

(72) Inventors: Katsuhiro Miyoshi, Nagoya (JP); Takashi Shimada, Otsu (JP); Takafumi Hashimoto, Nagoya (JP); Tetsuya Ohara, Otsu (JP); Tomonori Iizuka, Nagoya (JP); Shoji Nakashima, Nagoya (JP)

(73) Assignee: Toray Industries, Inc. (JP)

( * ) Notice: Subject to any disclaimer, the term of this patent is extended or adjusted under 35 U.S.C. 154(b) by 526 days.

This patent is subject to a terminal disclaimer.

(21) Appl. No.: 14/377,392

(22) PCT Filed: Feb. 5, 2013

(86) PCT No.: PCT/JP2013/052526
§ 371 (c)(1),
(2) Date: Aug. 7, 2014

(87) PCT Pub. No.: WO2013/118689
PCT Pub. Date: Aug. 15, 2013

(65) Prior Publication Data
US 2015/0005434 A1   Jan. 1, 2015

(30) Foreign Application Priority Data

Feb. 9, 2012 (JP) .................. 2012-026218

(51) Int. Cl.
*C08J 5/04* (2006.01)
*C08J 5/06* (2006.01)
*C08K 7/06* (2006.01)

(52) U.S. Cl.
CPC .............. *C08K 7/06* (2013.01); *C08J 5/042* (2013.01); *C08J 2323/12* (2013.01); *C08K 2201/004* (2013.01)

(58) Field of Classification Search
CPC .................. C08K 7/06; C08J 5/04; C08J 5/06

USPC ........................................................... 524/495
See application file for complete search history.

(56) References Cited

U.S. PATENT DOCUMENTS

| | | | |
|---|---|---|---|
| 9,481,770 B2 * | 11/2016 | Naruse | ............ C08J 5/042 |
| 2009/0004453 A1 * | 1/2009 | Murai | ............ B29C 43/003 |
| | | | 428/299.1 |
| 2011/0143110 A1 | 6/2011 | Tsuchiya et al. | |
| 2013/0317161 A1 | 11/2013 | Konagai et al. | |
| 2013/0344282 A1 | 12/2013 | Yagi et al. | |
| 2014/0077412 A1 | 3/2014 | Taniguchi et al. | |
| 2014/0094555 A1 | 4/2014 | Hashimoto et al. | |
| 2015/0158984 A1 | 6/2015 | Sonoda et al. | |

FOREIGN PATENT DOCUMENTS

| | | |
|---|---|---|
| JP | 5-329836 | 12/1993 |
| JP | 11-43839 | 2/1999 |
| JP | 2005-264383 | 9/2005 |
| JP | 2010-235779 | 10/2010 |
| JP | 2011-157524 | 8/2011 |
| JP | 2011-178890 † | 9/2011 |
| JP | 2011-178891 † | 9/2011 |
| WO | 2007/097436 | 8/2007 |
| WO | 2009/142291 | 11/2009 |
| WO | 2011/089929 † | 7/2011 |

\* cited by examiner
† cited by third party

*Primary Examiner* — Deve E Valdez
(74) *Attorney, Agent, or Firm* — DLA Piper LLP (US)

(57) ABSTRACT

A carbon fiber composite material includes the material is made of carbon fibers and a thermoplastic resin; the proportion Y, relative to the total weight of carbon fibers, of carbon fiber bundles for which $Mn/(Ln \times D)$ is $8.5 \times 10^{-1}$ $(mg/mm^2)$ or more, is $30 \leq Y < 90$ (wt %); the average value X of $Mn/Ln$ for the carbon fiber bundles is $1.1 \times 10^{-2} \leq X \leq 8.1 \times 10^{-2}$ (mg/mm); and Y satisfies $Y \geq 100X + 30$, wherein Mn: weight of carbon fiber bundles, Ln: fiber length of carbon fibers, D: fiber diameter of carbon fibers. The carbon fiber composite material combines high flowability and mechanical properties, has few variations in mechanical properties and shows an excellent adaptability of carbon fibers for small parts such as ribs.

20 Claims, 2 Drawing Sheets

CARBON FIBER COMPOSITE MATERIAL

TECHNICAL FIELD

This disclosure relates to a carbon fiber composite material, and specifically, to a carbon fiber composite material which can combine high flowability and mechanical properties when a molded article is made using the same.

BACKGROUND

A carbon fiber composite material comprising carbon fibers and a thermoplastic resin is used to manufacture various molded articles and, various technologies, aiming high mechanical properties of a manufactured molded article and a good flowability at the time of the manufacture, have been proposed. For example, in JP-A-2011-178890, a composite material is proposed wherein the proportion, relative to the whole amount of fibers, of specified carbon fiber bundles in a carbon fiber composite material is suppressed, and the average number of fibers in the respective specified carbon fiber bundles is controlled in a specified range.

However, in such a carbon fiber composite material as described in JP-A-2011-178890 wherein the carbon fiber bundles in the carbon fiber composite material are thin, the proportion of the bundles is few and the carbon fibers are refined, although the mechanical properties of a molded article manufactured using the same are excellent, the flowability at the time of molding is low and moldability is poor. This is because the carbon fibers, which are reinforcing fibers, are sufficiently distributed, therefore stress is hard to be concentrated and the reinforcing effect due to the carbon fibers is sufficiently exhibited. On the other hand, the carbon fibers are crossed relative to each other to restrict their movements and, therefore, the carbon fibers become hard to be moved.

On the other hand, in JP-A-2011-178891, a composite material is proposed wherein the proportion of specified carbon fiber bundles in a carbon fiber composite material relative to the whole amount of fibers, similar to that described above, is set higher, and the average number of fibers in the respective specified carbon fiber bundles is controlled in another specified range. However, in such a carbon fiber composite material as described in JP-A-2011-178891 wherein the carbon fiber bundles are thick and the proportion of the bundles is many, although the flowability at the time of manufacturing a molded article using the same is high and the moldability is excellent, the adaptability at molding of carbon fibers for ribs and small-shape parts is poor, and the mechanical properties are low and the variations in the mechanical properties are great. This is because the adaptability of carbon fibers for small member parts is poor because the carbon fiber bundles are thick, stress is liable to be concentrated to end portions of the carbon fibers, but the carbon fibers are easily moved because the carbon fibers do not form networks.

Accordingly, it could be helpful to provide a carbon fiber composite material which can combine high flowability and mechanical properties, that have not been achieved by the conventional carbon fiber composite materials as those described above, and has few variations in mechanical properties, and which is excellent also in adaptability of carbon fibers for small parts such as ribs or the like.

SUMMARY

We thus provide a carbon fiber composite material made of carbon fibers and a thermoplastic resin, a proportion Y, relative to the total weight of carbon fibers, of carbon fiber bundles (1) for which $Mn/(Ln \times D)$ is $8.5 \times 10$-1 ($mg/mm2$) or more, is $30 \leq Y < 90$ (wt %), an average value X of $Mn/Ln$ for the carbon fiber bundles (1) is $1.1 \times 10$-$2 \leq X \leq 8.1 \times 10$-2 (mg/mm), and the Y satisfies $Y \geq 100X + 30$ wherein Mn: weight of carbon fiber bundles, Ln: fiber length of carbon fibers, D: fiber diameter of carbon fibers.

In such a carbon fiber composite material, by satisfying the above-described specified ranges as shown in the results of Examples described later, high flowability can be obtained at the time of molding using the same as well as high mechanical properties of a molded article can be realized, variations of the mechanical properties are few and, for example, excellent adaptability of carbon fibers for small parts such as ribs or the like can be exhibited.

In the above-described carbon fiber composite material, to realize the combination of high 2flowability and mechanical properties more securely, it is preferred that the above-described average value X of Mn/Ln for the carbon fiber bundles (1) is $1.5 \times 10^{-2} \leq X \leq 5.5 \times 10^{-2}$ (mg/mm).

To realize the combination of high flowability and mechanical properties further securely, it is preferred that a standard deviation σ of a number of fibers $x_n$ ($=Mn/(Ln \times F)$) forming a bundle of the above-described carbon fiber bundles (1) is $50 \leq \sigma \leq 400$, wherein F is a fineness of carbon fibers, and the calculation methods of the number of fibers $x_n$ and the standard deviation σ will be described later.

Further, to exhibit an excellent adaptability of carbon fibers for small parts such as ribs or the like more securely, it is preferred that the above-described carbon fiber bundles (1) are formed from a carbon fiber bundle whose drape value/flexural stiffness ($cm/(Pa \cdot cm4)$) at 25° C. is $3.5 \times 103$ to $9.0 \times 103$ ($cm/(Pa \cdot cm4)$). The determination method of the drape value and the like will be described later.

Further, to realize, in particular, a high flowability more securely, it is preferred that the fiber length of carbon fibers Ln in the above-described carbon fiber bundles (1) is 5 to 25 mm.

Further, to realize, in particular, the combination of high flowability and mechanical properties more securely, it is preferred that the proportion Y, relative to the total weight of carbon fibers, of the above-described carbon fiber bundles (1) is $40 \leq Y \leq 65$ (wt %).

Further, to realize a good flowability more securely while realizing high mechanical properties, it is preferred that a single fiber flexural stiffness of carbon fibers forming the above-described carbon fiber bundles (1) is $1.0 \times 10^{-11}$ to $2.8 \times 10^{-11}$ ($Pa \cdot cm^4$).

Further, to realize a good flowability while realizing high mechanical properties stably, it is preferred that carbon fiber aggregates in the carbon fiber composite material comprise a carbon fiber non-woven fabric obtained by a carding process.

Further, from the viewpoint that a molded article having parts different in yield of carbon fibers or thickness can be easily manufactured, it is preferred that the carbon fiber composite material comprises a stampable sheet prepared by impregnating a thermoplastic resin into carbon fiber aggregates.

Thus, we provide a carbon fiber composite material which can combine high flowability and mechanical properties, which has few variations in mechanical properties, and is excellent also in adaptability of carbon fibers for small parts.

EXPLANATION OF SYMBOLS

1: carding machine
2: cylinder roll
3: take-in roll
4: doffer roll
5: worker roll
6: stripper roll
7: feed roll
8: belt conveyer
9: discontinuous carbon fibers
10: sheet-like web
11: carbon fiber composite material
12: rib shape
13: press table
21: carbon fiber bundle
22: fixing tape
23: weight
24: table
25: carbon fiber bundle
26: fixing tape

DETAILED DESCRIPTION

Hereinafter, our composite materials will be explained in detail together with Examples and Comparative Examples.

First, although the carbon fibers are not particularly restricted, high-strength and high-elastic modulus carbon fibers can be used, and one kind of carbon fibers may be used or two or more kinds of carbon fibers may be used together. In particular, PAN-base, pitch-base and rayon-base carbon fibers can be exemplified. From the viewpoint of the balance between the strength and the elastic modulus of a molded article to be obtained, PAN-base carbon fibers are more preferable. The density of carbon fibers is preferably 1.65 to 1.95 g/cm$^3$, and more preferably 1.70 to 1.85 g/cm$^3$. If the density is too high, the lightness in weight of a carbon fiber-reinforced plastic obtained is poor, and if too low, there is a case where the mechanical properties of a carbon fiber-reinforced plastic obtained become low.

Further, the carbon fibers are preferably formed as a bundle from the viewpoint of productivity, and it is preferred that the number of single fibers in the bundle is many. The number of single fibers for the carbon fiber bundle can be 1,000 to 350,000, and in particular, it is preferably 10,000 to 100,000.

The single fiber flexural stiffness of carbon fibers is preferably $1.0 \times 10^{-11}$ to $2.8 \times 10^{-11}$ (Pa·cm$^4$), and more preferably $1.0 \times 10^{-11}$ to $1.5 \times 10^{-11}$ (Pa·cm$^4$). By the condition where the single fiber flexural stiffness is in the above-described range, in the process for manufacturing carbon fiber aggregates described later, it makes possible to stabilize the quality of carbon fiber aggregates obtained.

Further, for the purpose of improving the adhesive property between carbon fibers and a matrix resin and the like, it is preferred that the carbon fibers are surface treated. As the method of the surface treatment, there are electrolytic treatment, ozone treatment, ultraviolet treatment and the like. Further, for the purposes of preventing the fuzz generation of carbon fibers, improving the convergence of carbon fibers, improving the adhesive property between carbon fibers and a matrix resin and the like, a sizing agent may be provided to the carbon fibers. As the sizing agent, a compound having a functional group such as an epoxy group, a urethane group, an amino group, and a carboxyl group can be used, and one kind or two or more kinds of these compounds may be used.

Further, as the sizing treatment, a treatment method is employed wherein a liquid containing a sizing agent (a sizing liquid) is provided after wet carbon fiber bundles, which are wetted by water and have a moisture content of about 20 to about 80 wt % by generally known surface treatment process and washing process, are dried.

Although the method of providing a sizing agent is not particularly restricted, for example, there are a method of dipping the fibers into a sizing liquid via rollers, a method of bringing the fibers into contact with a roller adhered with a sizing agent, a method of spraying an atomized sizing agent and the like. Further, although it may be any of a batch type and a continuous type, a continuous type is preferred because the productivity is good and the variation can be suppressed small. At that time, so that the adhesion amount of the effective components of the sizing agent relative to the carbon fibers can become uniform within an adequate range, it is preferred to control the concentration and the temperature of the sizing agent, the tension of the yarns and the like. Further, it is more preferred to vibrate the carbon fibers by a ultrasonic wave at the time of providing the sizing agent.

Although the temperature and the time for drying should be adjusted depending upon the adhesion amount of the compound, from the viewpoints of completely removing the solvent used for providing the sizing agent, shortening the time required for the drying, on the other hand, preventing the heat deterioration of the sizing agent and preventing the carbon fiber bundles from being grown stiff and being deteriorated with the bundle spreading property, the temperature of drying is preferably 150° C. or higher and 350° C. or lower, and more preferably 180° C. or higher and 250° C.

The adhesion amount of a sizing agent relative to the mass of only the carbon fibers is preferably 0.01 mass % or more and 10 mass % or less, more preferably 0.05 mass % or more and 5 mass % or less, and further preferably 0.1 mass % or more and 5 mass % or less. If less than 0.01 mass %, the effect of improving the adhesive property is hardly exhibited. If more than 10 mass %, the properties of a molded article may be reduced.

For the carbon fiber bundles to obtain the carbon fiber aggregates described later, the drape value/single fiber flexural stiffness, determined by dividing the drape value, that is an index representing the hardness of the carbon fiber bundle, with the single fiber flexural stiffness, is preferably $3.5 \times 10^3$ to $9.0 \times 10^3$ (cm/(Pa·cm4)), and more preferably $4.0 \times 10^3$ to $9.0 \times 10^3$ (cm/(Pa·cm4)). If the drape value/single fiber flexural stiffness is less than $3.5 \times 10^3$ (cm/(Pa·cm4)), the convergence of the fibers is poor, in the process of preparing the carbon fiber aggregates such as carding or air laid described later, the fibers are liable to be refined, it is possible that the moldability may deteriorate when made into a carbon fiber composite material, and if it exceeds $9.0 \times 10^3$ (cm/(Pa·cm4)), the wettability with a matrix resin deteriorates and the mechanical properties are poor when made into a carbon fiber composite material.

A thermoplastic resin is used as the matrix resin, the material of the thermoplastic matrix resin is not particularly restricted, and it can be appropriately selected within a range that does not greatly reduce the mechanical properties of the carbon fiber reinforced plastic. For example, a polyolefin-group resin such as polyethylene or polypropylene, a polyamide-group resin such as nylon 6 or nylon 6,6, a polyester-group resin such as polyethylene terephthalate or polybutylene terephthalate, or a resin such as a polyetherketone, a polyethersulfone, or an aromatic polyamide, can be used. For example, it is preferred that the thermoplastic matrix resin is at least one selected from the group consisting of polyamide, polyphenylene sulfide, polypropylene, polyetheretherketone and a phenoxy resin.

As the process of obtaining carbon fiber aggregates, a process such as carding or air laid can be exemplified. Carding means an operation of arranging the direction of discontinuous fibers or refining fibers by applying a force in an approximately same direction to the aggregates of discontinuous carbon fibers with a comb-like member. Generally, it is performed using a carding machine equipped with a roll having many needle-like projections on the surface and/or a roll wound with a metallic wire having saw blade-like projections.

When such a carding is carried out, it is preferred to control the time (residing time), during which carbon fibers reside in the carding machine, to be short, for the purpose of preventing the carbon fibers from being folded. Concretely, it is preferred to transfer the carbon fibers existing on the wires wound onto a cylinder roll of the carding machine to a doffer roll in a time as short as possible. Therefore, to accelerate such a transfer, it is preferred to rotate the cylinder roll at a high rotational speed, for example, such as 150 rpm or higher. Further, from a similar reason, the surface speed of the doffer roll is preferably a high speed, for example, such as 10 m/min. or higher.

Figure 1:
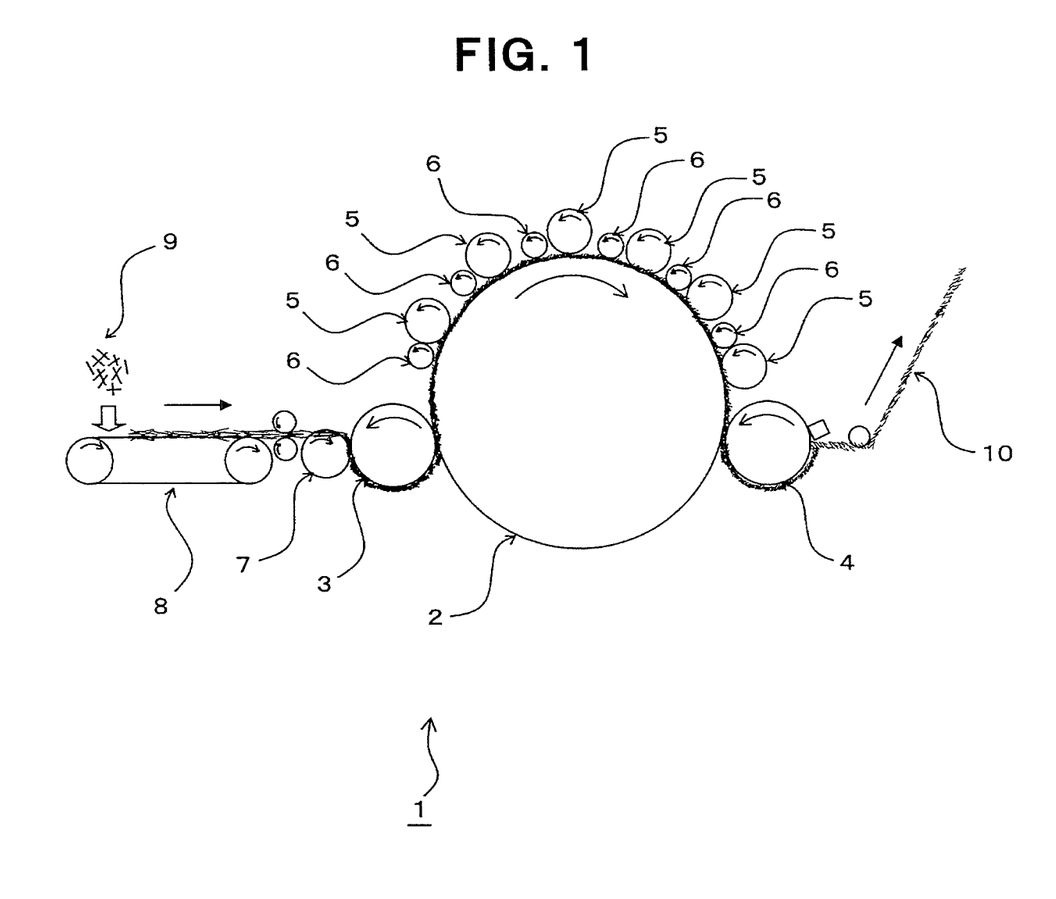
FIG. 1 is a schematic diagram showing an example of a carding machine.

The process of carding the carbon fiber bundles is not particularly restricted, and a general one can be used. For example, as shown in FIG. 1, a carding machine 1 mainly comprises a cylinder roll 2, a take-in roll 3 provided at an upstream side and closely to the outer circumferential surface of the cylinder roll 2, a doffer roll 4 provided closely to the outer circumferential surface of the cylinder roll 2 at a downstream side which is a side opposite to the side of the take-in roll 3, a plurality of worker rolls 5 provided closely to the outer circumferential surface of the cylinder roll 2 between the take-in roll 3 and the doffer roll 4, stripper rolls 6 provided closely to the worker rolls 5, and a feed roll 7 provided closely to the take-in roll 3, and a belt conveyer 8.

Aggregates of discontinuous carbon fiber bundles 9 are supplied to belt conveyer 8, and the carbon fiber bundles 9 are introduced onto the outer circumferential surface of cylinder roll 2 through the outer circumferential surface of feed roll 7 and then through the outer circumferential surface of take-in roll 3. Up to this stage, the carbon fiber bundles are refined and become floc-like aggregates of carbon fiber bundles. Although a part of the floc-like aggregates of carbon fiber bundles introduced onto the outer circumferential surface of cylinder roll 2 wind around the outer circumferential surface of worker rolls 5, these carbon fibers are stripped off by stripper rolls 6 and returned again onto the outer circumferential surface of the cylinder roll 2. Many needles, projections exist at standing conditions on the outer circumferential surfaces of the respective rolls of feed roll 7, take-in roll 3, cylinder roll 2, worker rolls 5 and stripper rolls 6, and in the above-described steps, by the operation of the needles, the carbon fiber bundles are refined into predetermined-condition bundles, and oriented to some extent. The carbon fiber bundles, refined into predetermined-condition bundles through such steps, move onto the outer circumferential surface of doffer roll 4 as a sheet-like web 10 which is one form of the carbon fiber aggregates.

Further, air laid is also not particularly restricted, and a general one can be used. This air laid is a process which obtains carbon fiber aggregates refined, distributed and fixed by a method of introducing cut carbon fiber bundles alone or cut carbon fiber bundles and thermoplastic resin fibers into a pipe, blowing compressed air and refining the fiber bundles, or a method of physically refining fiber bundles by a pin cylinder and the like.

Further, the carbon fiber aggregates mean aggregates kept in form by tangle or friction of fibers to each other at a condition where discontinuous carbon fiber bundles are refined and oriented by the above-described carding or air laid, and can be exemplified a thin sheet-like web, a non-woven fabric obtained by laminating webs, as needed, by tangle or adhesion and the like. From the viewpoint of uniformity of aggregates, the carbon fiber aggregates are preferably obtained by carding, and from the viewpoint of preventing carbon fibers from being folded, they are preferably obtained by air laid.

Although the carbon fiber aggregates may be formed by only carbon fibers, thermoplastic resin fibers can also be contained. It is preferred to add thermoplastic resin fibers because breakage of carbon fibers at the process of carding or air laid can be prevented. Because carbon fibers are rigid and fragile, they are hard to be tangled and liable to be broken. Therefore, there is a problem in the carbon fiber aggregates formed by only carbon fibers that during production, they are easily cut or the carbon fibers are liable to be fallen off. Accordingly, by containing thermoplastic resin fibers which are flexible and hard to be broken and liable to be tangled, carbon fiber aggregates high in uniformity can be formed. Where thermoplastic resin fibers are contained in carbon fiber aggregates, the content of carbon fibers in the carbon fiber aggregates is preferably 20 to 95 mass %, more preferably 50 to 95 mass %, and further preferably 70 to 95 mass %. If the content of carbon fibers is low, it becomes difficult to obtain high mechanical properties when a carbon fiber composite material is manufactured and, to the contrary, if the content of thermoplastic resin fibers is too low, an advantage of improving the above-described uniformity of the carbon fiber aggregates cannot be obtained.

The carbon fiber bundles in the carbon fiber aggregates comprise carbon fiber bundles (1) for which $Mn/(Ln \times D)$ is $8.5 \times 10^{-1}$ (mg/mm2) or more and single fibers or carbon fiber bundles for which $Mn/(Ln \times D)$ is less than $8.5 \times 10^{-1}$ (mg/mm2), the proportion Y of the carbon fiber bundles (1) relative to the total weight of carbon fibers is $30 \leq Y < 90$ (wt %), and by a condition where an average value X of Mn/Ln for the carbon fiber bundles (1), described later, and the above-described Y satisfy $Y \geq 100X+30$, can be obtained a carbon fiber composite material which can combine high flowability and mechanical properties, which has few variations in mechanical properties, and which is excellent also in adaptability of carbon fibers for small parts. In the equation: Mn: weight of carbon fiber bundles, Ln: fiber length of carbon fibers, D: fiber diameter of carbon fibers.

The above-described proportion Y is preferably $35 < Y \leq 80$ (wt %) and $Y \geq 100X+30$, more preferably $38 \leq Y \leq 75$ (wt %) and $Y \geq 100X+30$, and further preferably $40 \leq Y \leq 65$ (wt %). If the above-described proportion Y is lower than 30 wt % and 100X+30, the number of tangles of fiber bundles with each other increases, and the flowability deteriorates. If the above-described proportion Y exceeds 90, the mechanical properties deteriorate, and variations in mechanical properties become greater.

By a condition where the average value X of Mn/Ln for the carbon fiber bundles (1) in the carbon fiber aggregates is $1.1×10^{-2} ≤ X ≤ 8.1×10^{-2}$ (mg/mm), can be obtained a carbon fiber composite material which can combine high flowability and mechanical properties, which has few variations in mechanical properties, and which is also excellent in adaptability of carbon fibers for small parts.

The above-described average value X of Mn/Ln is preferably $1.5×10$-$2 ≤ X ≤ 5.5×10$-$2$ (mg/mm), more preferably $1.7×10$-$2 ≤ X ≤ 5.5×10$-$2$ (mg/mm), and further preferably $1.9×10$-$2 ≤ X ≤ 5.5×10$-$2$ (mg/mm). If the above-described average value X of Mn/Ln is lower than $1.1×10$-$2$, the number of tangles of fiber bundles with each other increases, and the flowability deteriorates. If the above-described average value X of Mn/Ln is higher than $8.1×10$-$2$, the mechanical properties and the adaptability of carbon fibers for small parts such as ribs or the like deteriorate, and variations in mechanical properties become greater.

By satisfying that a standard deviation σ of a number of carbon fibers forming a carbon fiber bundle describe later "xn" of the carbon fiber bundles (1) in the carbon fiber aggregates is $50 ≤ σ ≤ 400$ and by a condition where the carbon fiber bundles are dispersed and distributed in the above-described range, can be obtained a carbon fiber composite material which can combine high flowability and mechanical properties, which has few variations in mechanical properties, and which is excellent also in adaptability of carbon fibers for small parts. If the standard deviation σ is lower than 50, the flowability deteriorates, and if the standard deviation σ is higher than 400, the mechanical properties deteriorate, and variations in mechanical properties become greater. In the equation: F: fineness of carbon fibers.

The above-described standard deviation σ is preferably $100 ≤ σ ≤ 380$, more preferably $150 ≤ σ ≤ 350$, and further preferably $170 ≤ σ ≤ 300$.

When thermoplastic resin fibers are contained in the carbon fiber aggregates, the fiber length of the thermoplastic resin fibers is not particularly limited as long as it is in a favorable range such as keeping the form of the carbon fiber aggregate or preventing falling off of carbon fibers and, generally, thermoplastic resin fibers having a length of approximately 10 to 100 mm can be used. It is also possible to decide the fiber length of thermoplastic resin fibers relative to the fiber length of carbon fibers. For example, when the carbon fiber aggregates are stretched, because a stronger tension is applied to a fiber longer in fiber length, when it is desired to orient carbon fibers in the lengthwise direction of the carbon fiber aggregate by applying a tension to the carbon fibers, the fiber length of the carbon fibers can be set longer than the fiber length of the thermoplastic resin fibers, and in a contrary case, the fiber length of the carbon fibers can be set shorter than the fiber length of thermoplastic resin fibers.

Further, it is preferred to provide a crimp to the above-described thermoplastic resin fibers to enhance the effect of tangling due to the thermoplastic resin fibers. The degree of the crimp is not particularly limited as long as it is in a favorable range and, generally, thermoplastic resin fibers having a number of crimps of approximately 5 to 25 crests per 25 mm and a rate of crimp of approximately 3 to 30% can be used.

The material for such thermoplastic resin fibers is not particularly restricted, and it can be appropriately selected from a range that does not greatly reduce the mechanical properties of a carbon fiber composite material. For example, fibers can be used which are prepared by spinning a resin such as a polyolefin-group resin such as polyethylene or polypropylene, a polyamide-group resin such as nylon 6 or nylon 6,6, a polyester-group resin such as polyethylene terephthalate or polybutylene terephthalate, a polyetherketone, a polyethersulfone or an aromatic polyamide. It is preferred that such a material for thermoplastic resin fibers is appropriately selected in accordance with the combination with a matrix resin. In particular, thermoplastic resin fibers prepared using the same resin as a matrix resin, a resin having a compatibility with a matrix resin or a resin having a high adhesive property with a matrix resin is preferred, because the mechanical properties of a carbon fiber-reinforced plastic are not lowered. For example, the thermoplastic resin fibers are preferred to be composed of at least one kind of fibers selected from the group consisting of polyamide fibers, polyphenylene sulfide fibers, polypropylene fibers, polyetheretherketone fibers and phenoxy resin fibers.

When a matrix resin is impregnated into the carbon fiber aggregates, a method may be employed wherein carbon fiber aggregates containing thermoplastic resin fibers are prepared and the thermoplastic resin fibers contained in the carbon fiber aggregates are used as the matrix resin as they are, or a method may also be employed wherein carbon fiber aggregates not containing thermoplastic resin fibers are used as a raw material, and a matrix resin is impregnated at an arbitrary stage to produce a carbon fiber composite material. Further, even when carbon fiber aggregates containing thermoplastic resin fibers are used as the raw material, a matrix resin can be impregnated at an arbitrary stage of producing a carbon fiber composite material. In such a case, a resin forming thermoplastic resin fibers and a matrix resin may be an identical resin, and may be resins different from each other. When the resin forming thermoplastic resin fibers and the matrix resin are different from each other, it is preferred that both resins have a compatibility or a high affinity.

When the carbon fiber composite material is produced, a thermoplastic resin as a matrix resin is impregnated into the above-described carbon fiber aggregates, and the impregnation step of manufacturing the carbon fiber composite material can be carried out using a press machine having a heating function. The press machine is not particularly restricted as long as it can realize temperature and pressure required for impregnation of the matrix resin, a usual press machine having a plane-like platen moved vertically, or a so-called "double belt" press machine having a mechanism to run a pair of endless steel belts can be used. In such an impregnation step, after the matrix resin is prepared in a sheet-like form such as a film, a nonwoven fabric or a woven fabric, it is laminated with the carbon fiber aggregates, and at that condition, the matrix resin can be melted and impregnated using the above-described press machine. Further, a method can also be employed wherein discontinuous fibers are prepared using a matrix resin, by mixing them and inorganic fibers at a step of making carbon fiber aggregates, carbon fiber aggregates containing the matrix resin and the inorganic fibers are prepared, and the carbon fiber aggregates are heated and pressed using the press machine and the like.

Next, Examples and Comparative Examples will be explained.

First, the properties and determination methods used in the Examples and Comparative Examples will be explained.

(1) Method of Determining Bundles:

A sample with a size of 10 mm×100 mm was cut out from a carbon fiber composite material and, thereafter, the sample was heated in an electric furnace heated at 500° C. for about one hour to burn off organic substances such as the matrix resin. The mass of carbon fiber aggregates left after cooled down to a room temperature was determined, carbon fiber bundles were all extracted from the carbon fiber aggregates by a pincette. With respect to all the extracted carbon fiber bundles, using a balance capable of measuring up to a degree of 1/10,000 g, the weigh Mn and the length Ln of each carbon fiber bundle is determined. After the determination, for each bundle, Mn/Ln, Mn/(Ln×D) and xn=Mn/(Ln×F) are calculated, wherein D is a diameter of carbon fibers, F is a fineness of carbon fibers, and xn is a number of fibers forming a carbon fiber bundle. The determination is carried out at a condition where fiber bundles for which the value of Mn/(Ln×D) is 8.5×10-1 (mg/mm2) or more are referred to as carbon fiber bundles (1) and the total weight of the carbon fiber bundles (1) is referred to as MA, and the total number of the bundles is referred to as N. Further, the determination is carried out at a condition where carbon fiber bundles for which Mn/(Ln×D) is less than 8.5×10-1 (mg/mm2) are referred to as fiber bundles (2) and the total weight of the carbon fiber bundles (2) is referred to as MB. For fiber bundles refined to a degree at which the bundles cannot be extracted by a pincette, the weight thereof was determined in the lump at the last. Further, when the fiber length is small and the determination of weight becomes difficult, the fiber lengths may be classified at an interval of about 0.2 mm and the weights of a plurality of classified bundles may be determined in the lump, and an average value thereof may be used. After classifying and determining all bundles, for the carbon fiber bundles (1), $\Sigma(Mn/Ln)/N$, $x=\Sigma\{Mn/(Ln\times F)\}/N$ and $\sigma=\{1/N\times\Sigma(xn-x)2\}^{1/2}$ are calculated, and the average value X of Mn/Ln of carbon fiber bundles (1), the average value "x" of the numbers of fibers forming fiber bundles, and the standard deviation $\sigma$ of the numbers of fibers forming fiber bundles, are determined wherein N is the number of bundles of the carbon fiber bundles (1). Further, the proportion of carbon fiber bundles (1) relative to the total weight of carbon fiber bundles is determined by the following equation:

$$MA/(MA+MB)\times 100.$$

(2) Flow Test (Stamping Molding):

When the Matrix Resin is a Nylon (Ny):

After two sheets of carbon fiber composite materials each having a size of 100 mm×100 mm×2 mm were preheated at 260° C., two sheets were stacked and placed on a press table heated at 120° C., and pressed at 20 MPa for 5 seconds. The area of the sheet after this pressing A2 and the area before the pressing A1 were measured, and A2/A1 was determined as flowability (%).

When the Matrix Resin is a Polypropylene (PP):

After two sheets of carbon fiber composite materials each having a size of 100 mm×100 mm×2 mm were preheated at 230° C., two sheets were stacked and placed on a press table heated at 80° C., and pressed at 20 MPa for 5 seconds. The area of the sheet after this pressing A2 and the area before the pressing A1 were measured, and A2/A1 was determined as flowability (%).

Figure 2:
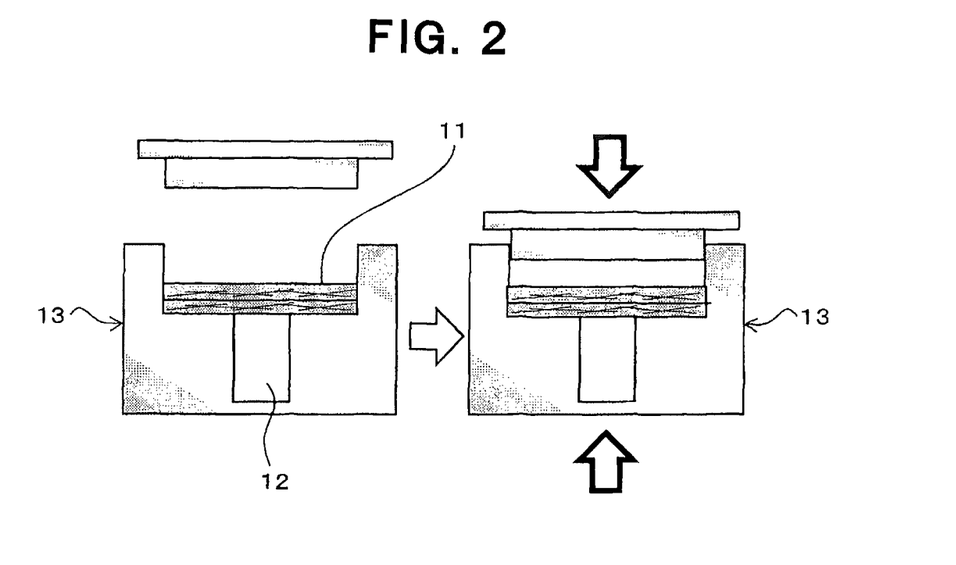
FIG. 2 is a schematic diagram showing a manner of rib molding test.

(3) Rib Molding Test (Stamping Molding):

When the Matrix Resin is an Ny:

As shown in FIG. 2, after two sheets of carbon fiber composite materials 11 each having a size of 100 mm×100 mm×2 mm were preheated at 260° C., two sheets were stacked and placed on a press table 13 heated at 120° C. and having a rib shape 12 with a height of 15 mm and a width of 1.0 mm and pressed at 15 MPa for 5 seconds. The molded article after pressing was taken out, the state of the rib was observed, a state, where the carbon fibers and the thermoplastic resin were flowed and filled up to the corner of the rib, was ranked as ○, a state, where the thermoplastic resin was filled up to the corner of the rib but a resin-rich part in which the carbon fibers were not filled was observed, was ranked as Δ, and a state, where the corner of the rib was not filled and a deficit was observed on the molded article, was ranked as X.

When the Matrix Resin is PP:

After two sheets of carbon fiber composite materials each having a size of 100 mm×100 mm×2 mm were preheated at 230° C., two sheets were stacked and placed on the press table heated at 80° C. and having the rib shape with a height of 15 mm and a width of 1.0 mm and pressed at 15 MPa for 5 seconds. The molded article after pressing was taken out, the state of the rib was observed, a state, where the carbon fibers and the thermoplastic resin were flowed and filled up to the corner of the rib, was ranked as ○, a state, where the thermoplastic resin was filled up to the corner of the rib but a resin-rich part in which the carbon fibers were not filled was observed, was ranked as Δ, and a state, where the corner of the rib was not filled and a deficit was observed on the molded article, was ranked as X.

(4) Vf (Percentage Content of Carbon Fibers in Carbon Fiber Reinforced Plastic):

A sample of about 2 g was cut out from a molded article of a carbon fiber reinforced plastic, and the mass thereof was determined. Thereafter, the sample was heated in an electric furnace heated at 500° C. for one hour and organic substances such as a matrix resin were burnt off. After cooled down to a room temperature, the mass of the residual carbon fibers was determined. The rate of the mass of the carbon fibers to the mass of the sample before being burnt off with organic substances such as a matrix resin was determined, and it was defined as the percentage content of carbon fibers.

(5) Flexural Test:

A flexural strength was determined based on JIS-K7171.

(6) Fiber Strength Utilization Factor:

It was calculated by the following equation.

$$\text{Fiber strength utilization factor}=\text{Flexural strength}/Vf$$

(7) Single Fiber Flexural Stiffness (Pa·m$^4$):

It was calculated by Single fiber flexural stiffness=E×I, wherein E: single fiber elastic modulus, I: geometrical moment of inertia.

The cross section of a fiber was supposed as a true circle, the geometrical moment of inertia was determined from the fiber diameter D, and the flexural stiffness was determined from the single fiber tensile elastic modulus and the geometrical moment of inertia.

(8) Drape Value/Single Fiber Flexural Stiffness:

It was determined as an index of the convergence of a sizing agent (Sz agent) by dividing the drape value, that is an index representing the hardness of the carbon fiber bundle, with the single fiber flexural stiffness.

Figure 3:
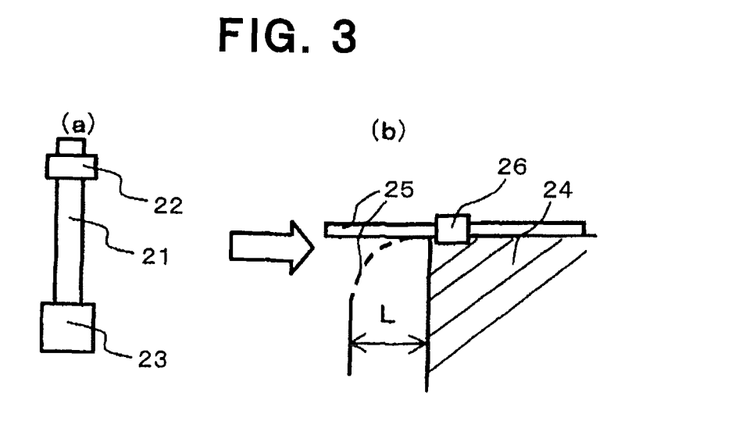
FIG. 3 is a schematic diagram of a measurement device showing a determination method of a drape value.

(9) Drape Value (Cm):

As shown in FIG. 3(a), a carbon fiber bundle 21 drawn out from a bobbin without applying a tension is cut at a length of 40 cm, one end thereof is fixed by a fixing tape 22, a weight 23 of 100 g is hung at the other end thereof, and after the twist and the bending are corrected, it is left in a measurement-temperature atmosphere for 30 minutes. Next, the weight 23 is removed, as shown in FIG. 3(b), the carbon fiber bundle 25 is placed on a horizontal and rectangular table 24 having a corner of 90° so as to protrude from the table by 25 cm, and after the part of carbon fibers on the table is fixed by a fixing tape 26 while the carbon fiber bundle with 40 cm is supported to not be broken, the support for the part protruding from the table is removed and the part is hung down, and after 2 seconds, the length of a horizontal distance L from the beginning point is measured, and the average value of "n" number of 3 times is defined as a drape value.

EXAMPLES

First, carbon fiber bundles (before cutting) used in Examples and Comparative Examples will be explained.

Carbon Fiber Bundle (A):

The carbon fiber bundle (A) was prepared by providing 1.0 wt % of an aqueous sizing agent (Sz agent) (A) containing 100% component of polyethylene glycol diglycidylether (molecular weight=670) to a continuous carbon fiber bundle having a fiber diameter of 5.5 μm, a tensile elastic modulus of 294 GPa, a single fiber flexural stiffness of $1.32 \times 10^{-11}$ Pa·m$^4$ and a number of filaments of 24,000. At that time, the drape value of the carbon fiber bundle (A) was 6.6 cm.

Carbon Fiber Bundle (B):

The carbon fiber bundle (B) was prepared by providing 1.0 wt % of a sizing agent (B) containing 40% component of bisphenol A type epoxy resin (molecular weight=370), 40% component of bisphenol A type ethylene oxide maleic ester (molecular weight=2,500) and 20% component of an emulsifier to a continuous carbon fiber bundle having a fiber diameter of 7 μm, a tensile elastic modulus of 230 GPa, a single fiber flexural stiffness of $2.71 \times 10^{-11}$ Pa·m$^4$ and a number of filaments of 24,000. At that time, the drape value of the carbon fiber bundle (B) was 16.8 cm.

Carbon Fiber Bundle (C):

The carbon fiber bundle (C) was prepared by providing 1.0 wt % of a sizing agent (C), which was prepared by using a water dispersion of polyurethane resin ("SUPERFLEX" (registered trademark) 300, supplied by Dai-ichi Kogyo Seiyaku Co., Ltd.) and diluting the sizing agent by water to control the concentration of the sizing agent at 1.0%, to a continuous carbon fiber bundle having a fiber diameter of 7 μm, a tensile elastic modulus of 230 GPa, a single fiber flexural stiffness of $2.71 \times 10^{-11}$ Pa·m$^4$ and a number of filaments of 24,000. At that time, the drape value of the carbon fiber bundle (C) was 22.0 cm.

Carbon Fiber Bundle (D):

The carbon fiber bundle (D) was prepared without providing a sizing agent to a continuous carbon fiber bundle having a fiber diameter of 7 μm, a tensile elastic modulus of 230 GPa, a single fiber flexural stiffness of $2.71 \times 10^{-11}$ Pa·m$^4$ and a number of filaments of 24,000. At that time, the drape value of the carbon fiber bundle (D) was 2.0 cm.

Example 1

The carbon fiber bundle (A) was cut at a fiber length of 10 mm, the cut carbon fiber bundles and nylon 6 short fibers (fineness of short fiber: 1.7 dtex, cut length: 51 mm, number of crimps: 12 crests per 25 mm, rate of crimp: 15%) were mixed at a mass ratio of 90:10, and the mixture was introduced into a carding machine. The web having come out was cross wrapped to form sheet-like carbon fiber aggregates comprising carbon fibers and nylon 6 fibers and having an areal weight of 100 g/cm$^2$.

The winding direction of the sheet-like carbon fiber aggregates was referred to as 0°, 12 sheets of the carbon fiber aggregates were stacked to form a structure of (0°/90°/0°/90°/0°/90°)s and, further, after a nylon resin melt blow nonwoven fabric ("CM1001", ηr=2.3, supplied by Toray Industries, Inc.) was stacked so that the volume ratio of the carbon fibers to the thermoplastic resin became 25:75 as the whole of the stacked carbon fiber aggregates, the whole was nipped by stainless plates, and after preheating at 240° C. for 90 seconds, it was hot pressed at 240° C. for 180 seconds while being applied with a pressure of 2.0 MPa. Then, it was cooled down to 50° C. at the pressed condition to obtain a flat plate of carbon fiber composite material having a thickness of 2 mm. When the flexural strengths in 0° and 90° directions were determined relative to the 0° direction of the surface layer of the obtained flat plate, the average value of the flexural strengths in 0° and 90° directions was 450 MPa, the fiber strength utilization factor was 18 MPa/ %, and the CV value was less than 5%.

When a sample having a size of 10 mm×100 mm was cut out from the obtained flat plate and the determination of the fiber bundles, the flow test and the rib molding test were performed, a good article could be obtained in which the proportion Y of carbon fiber bundles (1) relative to the total weight of carbon fibers was 55 wt %, the average value X of Mn/Ln was 0.022 mg/mm, the standard deviation σ was 260, the flowability was 32%, and carbon fibers flowed up to the corner of the standing-up part of the rib. The conditions and the results of the determinations and the evaluations are shown in Table 1.

Examples 2 to 10

Flat plates of carbon fiber composite materials were obtained in manners similar to that of Example 1 other than the conditions changed as shown in Table 1 relative to Example 1. The conditions and the results of the determinations and the evaluations are shown together in Table 1.

Example 11

A manner similar to that of Example 1 was employed other than the conditions where the carbon fiber bundle (B) was cut at a fiber length of 15 mm, the cut carbon fiber bundles and polypropylene short fibers (fineness of short fiber: 1.7 dtex, cut length: 51 mm, number of crimps: 12 crests per 25 mm, rate of crimp: 15%) were mixed at a mass ratio of 90:10, sheet-like carbon fiber aggregates comprising carbon fibers and polypropylene fibers and having an areal weight of 100 g/cm$^2$ were formed, and a polypropylene resin melt blow nonwoven fabric ("J709QG", MFR=55 g/10 min, supplied by Prime Polymer Co., Ltd.) was stacked so that the volume ratio of the carbon fibers to the thermoplastic resin became 25:75. The conditions and the results of the determinations and the evaluations are shown in Table 2.

Examples 12 to 14, and 18 to 20

Flat plates of carbon fiber composite materials were obtained in manners similar to that of Example 1 other than the conditions changed as shown in Table 2 relatively to Example 1. The conditions and the results of the determinations and the evaluations are shown together in Table 2.

Example 15

The carbon fiber bundle (B) was cut at a fiber length of 6 mm, and the cut carbon fiber bundles and nylon 6 discontinuous fibers (fineness of short fiber: 1.7 dtex, cut length: 6 mm) were mixed at a mass ratio of 90:10. The mixture of the cut carbon fiber bundles and the nylon 6 discontinuous fibers was supplied into a pipe having small holes, compressed air was sent thereto, and refining was performed in the pipe. Next, a table capable of moving X and Y directions was placed at a position below the outlet of the pipe, suction was performed by a blower from the lower part of the table, and sheet-like carbon fiber aggregates comprising carbon fibers and nylon 6 fibers and having an areal weight of 100 g/cm² was obtained.

The winding direction of the sheet-like carbon fiber aggregates was referred to as 0°, 12 sheets of the carbon fiber aggregates were stacked to form a structure of (0°/90°/0°/90°/0°/90°)s and, further, after a nylon resin melt blow nonwoven fabric ("CM1001", ηr=2.3, supplied by Toray Industries, Inc.) was stacked so that the volume ratio of the carbon fibers to the thermoplastic resin became 25:75 as the whole of the stacked carbon fiber aggregates, the whole was nipped by stainless plates, and after preheating at 240° C. for 90 seconds, it was hot pressed at 240° C. for 180 seconds while being applied with a pressure of 2.0 MPa. Then, it was cooled down to 50° C. at the pressed condition to obtain a flat plate of carbon fiber composite material having a thickness of 2 mm. When the flexural strengths in 0° and 90° directions were determined relative to the 0° direction of the surface layer of the obtained flat plate, the average value of the flexural strengths in 0° and 90° directions was 375 MPa, the fiber strength utilization factor was 15.0 MPa/%, and the CV value was less than 5%.

Further, when a sample having a size of 10 mm×100 mm was cut out from the obtained flat plate and the determination of the fiber bundles, the flow test and the rib molding test were performed, a good article could be obtained in which the proportion Y of carbon fiber bundles (1) relative to the total weight of carbon fibers was 80 wt %, the average value X of Mn/Ln was 0.42 mg/mm, the standard deviation σ was 315, the flowability was 340%, and carbon fibers flowed up to the corner of the standing-up part of the rib. The conditions and the results of the determinations and the evaluations are shown together in Table 2.

Examples 16 and 17

Flat plates of carbon fiber composite materials were obtained in manners similar to that of Example 1 other than the conditions changed as shown in Table 2 relatively to Example 15. The conditions and the results of the determinations and the evaluations are shown together in Table 2.

Comparative Example 1

The conditions were similar to those in Example 1 other than the conditions where the carbon fiber bundle (B) was cut at a fiber length of 15 mm, the cut carbon fiber bundles and nylon 6 discontinuous fibers (fineness of short fiber: 1.7 dtex, cut length: 51 mm, number of crimps: 12 crests per 25 mm, rate of crimp: 15%) were mixed at a mass ratio of 90:10, and the mixture was introduced into a carding machine to obtain a mixed raw stock comprising refined carbon fibers and nylon 6 fibers. As shown in Table 3, although the fiber strength utilization factor is good, the flowability and adaptability of carbon fibers for the rib are poor.

Comparative Example 2

The conditions were similar to those in Example 1 other than the conditions where the carbon fiber bundle (D) was cut at a fiber length of 15 mm, the cut carbon fiber bundles and nylon 6 discontinuous fibers (fineness of short fiber: 1.7 dtex, cut length: 51 mm, number of crimps: 12 crests per 25 mm, rate of crimp: 15%) were mixed at a mass ratio of 90:10, and the mixture was introduced into a carding machine. The results are shown together in Table 3. Although the fiber strength utilization factor is good, the flowability and adaptability of carbon fibers for the rib are poor.

Comparative Example 3

It was carried out at the conditions shown in Table 3. As a result, as shown in Table 3, although the flowability is good, adaptability of carbon fibers for the rib is poor, fiber strength utilization factor is low, and dispersion of properties is great.

Comparative Example 4

It was carried out at the conditions shown in Table 3. As a result, as shown in Table 3, although the flowability is good, adaptability of carbon fibers for the rib is poor, fiber strength utilization factor is low, and dispersion of properties is great.

Comparative Example 5

The carbon fiber bundle (B) was cut at a fiber length of 15 mm, the cut carbon fiber bundles and nylon 6 short fibers (fineness of short fiber: 1.7 dtex, cut length: 6 mm) were mixed at a mass ratio of 90:10, the mixture of the cut carbon fiber bundles and the nylon 6 discontinuous fibers was supplied into a pipe having small holes, compressed air was sent thereto, and refining was performed in the pipe. Next, a table capable of moving X and Y directions was placed at a position below the outlet of the pipe, suction was performed by a blower from the lower part of the table, and sheet-like carbon fiber aggregates comprising carbon fibers and nylon 6 fibers and having an areal weight of 100 g/cm² was obtained.

The winding direction of the sheet-like carbon fiber aggregates was referred to as 0°, 12 sheets of the carbon fiber aggregates were stacked to form a structure of (0°/90°/0°/90°/0°/90°)s and, further, after a nylon resin melt blow nonwoven fabric ("CM1001", ηr=2.3, supplied by Toray Industries, Inc.) was stacked so that the volume ratio of the carbon fibers to the thermoplastic resin became 44:56 as the whole of the stacked carbon fiber aggregates, the whole was nipped by stainless plates, and after preheating at 240° C. for 90 seconds, it was hot pressed at 240° C. for 180 seconds while being applied with a pressure of 2.0 MPa. Then, it was cooled down to 50° C. at the pressed condition to obtain a flat plate of carbon fiber composite material having a thickness of 2 mm. When the flexural strengths in 0° and 90° directions were determined relative to the 0° direction of the surface layer of the obtained flat plate, the average value of the flexural strengths in 0° and 90° directions was 425 MPa, the fiber strength utilization factor was low to be 9.7 MPa/%, and the CV value was more than 5%, and it was a composite material having a great dispersion.

Further, when a sample having a size of 10 mm×100 mm was cut out from the obtained flat plate and the determination of the fiber bundles, the flow test and the rib molding test were performed, the proportion Y of carbon fiber bundles (1) relative to the total weight of carbon fibers was 55 wt %, the average value X of Mn/Ln was 0.12 mg/mm, the standard deviation σ was 700, the flowability was 320%, and carbon fibers did not follow to the corner of the standing-up part of the rib and a resin-rich part was observed. The results are shown together in Table 3.

Comparative Example 6

The carbon fiber bundle (B) was cut at a fiber length of 15 mm, the cut carbon fiber bundles and polypropylene short fibers (fineness of short fiber: 1.7 dtex, cut length: 6 mm) were mixed at a mass ratio of 90:10, the mixture of the cut carbon fiber bundles and the polypropylene fibers was supplied into a pipe having small holes, compressed air was sent thereto, and refining was performed in the pipe. Next, a table capable of moving X and Y directions was placed at a position below the outlet of the pipe, suction was performed by a blower from the lower part of the table, and sheet-like carbon fiber aggregates comprising carbon fibers and polypropylene fibers and having an areal weight of 250 g/cm$^2$ was obtained. The conditions were employed similarly to those of Comparative Example 5 other than the conditions where the MD (Machine Direction) of the sheet-like carbon fiber aggregates was referred to as 0°, 12 sheets of the carbon fiber aggregates were stacked to form a structure of (0°/90°/0°/90°/0°/90°)s and, further, a polypropylene resin melt blow nonwoven fabric ("J709QG", MFR=55 g/10 min, supplied by Prime Polymer Co., Ltd.) was stacked so that the volume ratio of the carbon fibers to the thermoplastic resin became 44:56 as the whole of the stacked carbon fiber aggregates.

When the flexural strengths in 0° and 90° directions were determined relative to the 0° direction of the surface layer of the obtained flat plate, the average value of the flexural strengths in 0° and 90° directions was 330 MPa, the fiber strength utilization factor was low to be 7.5 MPa/%, and the CV value was more than 5%, and it was a composite material having a great dispersion.

Further, when a sample having a size of 10 mm×100 mm was cut out from the obtained flat plate and the determination of the fiber bundles, the flow test and the rib molding test were performed, the proportion Y of carbon fiber bundles (1) relative to the total weight of carbon fibers was 57 wt %, the average value X of Mn/Ln was 0.12 mg/mm, the standard deviation σ was 700, the flowability was 320%, and carbon fibers did not follow to the corner of the standing-up part of the rib and a resin-rich part was observed. The results are shown together in Table 3.

Comparative Example 7

A flat plate of carbon fiber composite material was obtained in a manner similar to that of Comparative Example 5 other than the conditions changed as shown in Table 3 relatively to Comparative Example 5. The conditions and the results of the determinations and the evaluations are shown together in Table 3.

TABLE 1

| | | Example | | | | |
|---|---|---|---|---|---|---|
| | | 1 | 2 | 3 | 4 | 5 |
| Carbon fiber bundle used before cutting | | Carbon fiber bundle (A) | Carbon fiber bundle (A) | Carbon fiber bundle (A) | Carbon fiber bundle (A) | Carbon fiber bundle (A) |
| Single fiber flexural stiffness | [Pa · m$^4$] | $1.32 \times 10^{-11}$ | $1.32 \times 10^{-11}$ | $1.32 \times 10^{-11}$ | $1.32 \times 10^{-11}$ | $1.32 \times 10^{-11}$ |
| D: fiber diameter | [μm] | 5.5 | 5.5 | 5.5 | 5.5 | 5.5 |
| Sz agent | | (A) | (A) | (A) | (A) | (A) |
| Drape value/flexural stiffness | [cm/(Pa · cm$^4$)] | $5.0 \times 10^3$ | $5.0 \times 10^3$ | $5.0 \times 10^3$ | $5.0 \times 10^3$ | $5.0 \times 10^3$ |
| L: fiber length | [mm] | 10 | 15 | 15 | 15 | 25 |
| Y: proportion of carbon fiber bundles (1) | [%] | 55 | 50 | 50 | 50 | 45 |
| X: average value of Mn/Ln | [mg/mm] | 0.022 | 0.02 | 0.02 | 0.02 | 0.016 |
| x: average value of number of fibers forming bundle | [number] | 520 | 470 | 470 | 470 | 380 |
| σ: standard deviation | | 260 | 240 | 240 | 240 | 190 |
| Resin | | CM1001 | CM1001 | CM1001 | CM1001 | CM1001 |
| Vf | [%] | 25 | 15 | 25 | 35 | 25 |
| Flowability | [%] | 320 | 330 | 300 | 280 | 260 |
| State of rib | | ○ | ○ | ○ | ○ | ○ |
| Flexural strength JIS-K7171 | [MPa] | 450 | 340 | 450 | 580 | 445 |
| CV value | [%] | ○ | ○ | ○ | ○ | ○ |
| Fiber strength utilization factor | [MPa/%] | 18.0 | 22.7 | 18.0 | 16.6 | 17.8 |

| | | Example | | | | |
|---|---|---|---|---|---|---|
| | | 6 | 7 | 8 | 9 | 10 |
| Carbon fiber bundle used before cutting | | Carbon fiber bundle (A) | Carbon fiber bundle (B) | Carbon fiber bundle (B) | Carbon fiber bundle (B) | Carbon fiber bundle (B) |
| Single fiber flexural stiffness | [Pa · m$^4$] | $1.32 \times 10^{-11}$ | $2.71 \times 10^{-11}$ | $2.71 \times 10^{-11}$ | $2.71 \times 10^{-11}$ | $2.71 \times 10^{-11}$ |
| D: fiber diameter | [μm] | 5.5 | 7 | 7 | 7 | 7 |
| Sz agent | | (A) | (B) | (B) | (B) | (B) |
| Drape value/flexural stiffness | [cm/(Pa · cm$^4$)] | $5.0 \times 10^3$ | $6.2 \times 10^3$ | $6.2 \times 10^3$ | $6.2 \times 10^3$ | $6.2 \times 10^3$ |
| L: fiber length | [mm] | 50 | 10 | 15 | 15 | 25 |
| Y: proportion of carbon fiber bundles (1) | [%] | 35 | 50 | 35 | 45 | 45 |
| X: average value of Mn/Ln | [mg/mm] | 0.013 | 0.03 | 0.024 | 0.027 | 0.027 |
| x: average value of number of fibers forming bundle | [number] | 300 | 440 | 350 | 390 | 390 |
| σ: standard deviation | | 160 | 270 | 210 | 240 | 200 |
| Resin | | CM1001 | CM1001 | CM1001 | CM1001 | CM1001 |
| Vf | [%] | 25 | 25 | 25 | 25 | 25 |

TABLE 1-continued

| | | | | | | |
|---|---|---|---|---|---|---|
| Flowability | [%] | 230 | 310 | 290 | 300 | 270 |
| State of rib | | Δ | ◯ | ◯ | ◯ | ◯ |
| Flexural strength JIS-K7171 | [MPa] | 440 | 390 | 395 | 390 | 395 |
| CV value | [%] | ◯ | ◯ | ◯ | ◯ | ◯ |
| Fiber strength utilization factor | [MPa/%] | 17.6 | 15.6 | 15.8 | 15.6 | 15.8 |

◯: filled up to a corner of rib, and a resin-rich part is not also observed.

Δ: filled up to a corner of rib, but the corner becomes resin-rich.

X: a corner of rib is not filled.

◯: CV value is lower than 5%.

X: CV value is 5% or higher.

TABLE 2

| | | Example | | | | |
|---|---|---|---|---|---|---|
| | | 11 | 12 | 13 | 14 | 15 |
| Carbon fiber bundle used before cutting | | Carbon fiber bundle (B) | Carbon fiber bundle (B) | Carbon fiber bundle (B) | Carbon fiber bundle (C) | Carbon fiber bundle (B) |
| Single fiber flexural stiffness | [Pa·m$^4$] | $2.71 \times 10^{-11}$ | $2.71 \times 10^{-11}$ | $2.71 \times 10^{-11}$ | $2.71 \times 10^{-11}$ | $2.71 \times 10^{-11}$ |
| D: fiber diameter | [μm] | 7 | 7 | 7 | 7 | 7 |
| Sz agent | | (B) | (B) | (B) | (C) | (B) |
| Drape value/flexural stiffness | [cm/(Pa·cm$^4$)] | $6.2 \times 10^3$ | $6.2 \times 10^3$ | $6.2 \times 10^3$ | $8.1 \times 10^3$ | $6.2 \times 10^3$ |
| L: fiber length | [mm] | 15 | 15 | 25 | 15 | 6 |
| Y: proportion of carbon fiber bundles (1) | [%] | 45 | 55 | 38 | 60 | 80 |
| X: average value of Mn/Ln | [mg/mm] | 0.027 | 0.035 | 0.024 | 0.048 | 0.042 |
| x: average value of number of fibers forming bundle | [number] | 390 | 500 | 340 | 700 | 340 |
| σ: standard deviation | | 240 | 290 | 200 | 300 | 315 |
| Resin | | J709QG | CM1001 | CM1001 | CM1001 | CM1001 |
| Vf | [%] | 25 | 25 | 25 | 25 | 25 |
| Flowability | [%] | 260 | 320 | 280 | 330 | 340 |
| State of rib | | ◯ | ◯ | ◯ | ◯ | ◯ |
| Flexural strength JIS-K7171 | [MPa] | 310 | 395 | 395 | 380 | 375 |
| CV value | [%] | ◯ | ◯ | ◯ | ◯ | ◯ |
| Fiber strength utilization factor | [MPa/%] | 12.4 | 15.8 | 15.8 | 15.2 | 15.0 |

| | | Example | | | | |
|---|---|---|---|---|---|---|
| | | 16 | 17 | 18 | 19 | 20 |
| Carbon fiber bundle used before cutting | | Carbon fiber bundle (B) | Carbon fiber bundle (B) | Carbon fiber bundle (B) | Carbon fiber bundle (B) | Carbon fiber bundle (B) |
| Single fiber flexural stiffness | [Pa·m$^4$] | $2.71 \times 10^{-11}$ | $2.71 \times 10^{-11}$ | $2.71 \times 10^{-11}$ | $2.71 \times 10^{-11}$ | $2.71 \times 10^{-11}$ |
| D: fiber diameter | [μm] | 7 | 7 | 7 | 7 | 7 |
| Sz agent | | (B) | (B) | (B) | (B) | (B) |
| Drape value/flexural stiffness | [cm/(Pa·cm$^4$)] | $6.2 \times 10^3$ | $6.2 \times 10^3$ | $6.2 \times 10^3$ | $6.2 \times 10^3$ | $6.2 \times 10^3$ |
| L: fiber length | [mm] | 15 | 15 | 15 | 15 | 15 |
| Y: proportion of carbon fiber bundles (1) | [%] | 80 | 86 | 35 | 38 | 38 |
| X: average value of Mn/Ln | [mg/mm] | 0.054 | 0.062 | 0.017 | 0.019 | 0.054 |
| x: average value of number of fibers forming bundle | [number] | 780 | 900 | 240 | 280 | 780 |
| σ: standard deviation | | 340 | 390 | 130 | 145 | 350 |
| Resin | | CM1001 | CM1001 | CM1001 | CM1001 | CM1001 |
| Vf | [%] | 25 | 25 | 25 | 25 | 25 |
| Flowability | [%] | 350 | 350 | 270 | 290 | 290 |
| State of rib | | ◯ | ◯ | ◯ | ◯ | ◯ |
| Flexural strength JIS-K7171 | [MPa] | 365 | 350 | 400 | 400 | 390 |
| CV value | [%] | ◯ | ◯ | ◯ | ◯ | ◯ |
| Fiber strength utilization factor | [MPa/%] | 14.6 | 14.0 | 16.0 | 16.0 | 15.6 |

◯: filled up to a corner of rib, and a resin-rich part is not also observed.

Δ: filled up to a corner of rib, but the corner becomes resin-rich.

X: a corner of rib is not filled.

◯: CV value is lower than 5%.

X: Clue is 5% or higher.

TABLE 3

| | | Comparative Example | | | | | | |
|---|---|---|---|---|---|---|---|---|
| | | 1 | 2 | 3 | 4 | 5 | 6 | 7 |
| Carbon fiber bundle used before cutting | | Carbon fiber bundle (B) | Carbon fiber bundle (D) | Carbon fiber bundle (B) | Carbon fiber bundle (B) | Carbon fiber bundle (B) | Carbon fiber bundle (B) | Carbon fiber bundle (B) |
| D: fiber diameter | [μm] | 7 | 7 | 7 | 7 | 7 | 7 | 7 |
| Single fiber flexural stiffness | [Pa · m$^4$] | 2.71 × 10$^{-11}$ | 2.71 × 10$^{-11}$ | 2.71 × 10$^{-11}$ | 2.71 × 10$^{-11}$ | 2.71 × 10$^{-11}$ | 2.71 × 10$^{-11}$ | 2.71 × 10$^{-11}$ |
| Sz agent | | (B) | none | (B) | (B) | (B) | (B) | (B) |
| Drape value/flexural stiffness | [cm/(Pa · cm$^4$)] | 6.2 × 10$^3$ | 1.8 × 10$^3$ | 6.2 × 10$^3$ | 6.2 × 10$^3$ | 6.2 × 10$^3$ | 6.2 × 10$^3$ | 6.2 × 10$^3$ |
| L: fiber length | [mm] | 15 | 15 | 15 | 10 | 15 | 15 | 10 |
| Y: proportion of carbon fiber bundles (1) | [%] | 18 | 23 | 53 | 35 | 55 | 57 | 18 |
| X: average value of Mn/Ln | [mg/mm] | 0.007 | 0.009 | 0.083 | 0.057 | 0.12 | 0.12 | 0.12 |
| x: average value of number of fibers forming bundle | [number] | 100 | 130 | 1200 | 820 | 1700 | 1750 | 450 |
| σ: standard deviation | | 40 | 44 | 650 | 500 | 700 | 700 | 430 |
| Resin | | CM1001 | CM1001 | CM1001 | CM1001 | CM1001 | J709QG | CM1001 |
| Vf | [%] | 25 | 25 | 25 | 25 | 44 | 44 | 25 |
| Flowability | [%] | 160 | 180 | 340 | 290 | 320 | 290 | 250 |
| State of rib | | X | X | Δ | ○ | Δ | Δ | X |
| Flexural strength JIS-K7171 | [MPa] | 390 | 390 | 345 | 380 | 425 | 330 | 385 |
| CV value | [%] | ○ | ○ | X | X | X | X | ○ |
| Fiber strength utilization factor | [MPa/%] | 15.6 | 15.6 | 13.8 | 15.2 | 9.7 | 7.5 | 15.4 |

○: filled up to a corner of rib, and a resin-rich part is not also observed.
Δ: filled up to a corner of rib, but the corner becomes resin-rich.
X: a corner of rib is not filled.
○: CV value is lower than 5%.
X: CV value is 5% or higher.

INDUSTRIAL APPLICATIONS

The carbon fiber composite material can be applied to manufacture any carbon fiber reinforced molded article required with combination of high flowability and mechanical properties and few variations in mechanical properties, that have not been achieved by the conventional technologies.

The invention claimed is:

1. A carbon fiber composite material comprising carbon fibers and a thermoplastic resin, a proportion Y, relative to the total weight of carbon fibers, of carbon fiber bundles for which Mn/(Ln×D) is 8.5×10$^{-1}$ (mg/mm$^2$) or more, is 30≤Y<90 (wt %), an average value X of Mn/Ln for said carbon fiber bundles is 1.1×10$^{-2}$≤X≤8.1×10$^{-2}$ (mg/mm), and said Y satisfies Y≥100X +30, wherein Mn: weight of carbon fiber bundles, Ln: fiber length of carbon fibers, D: fiber diameter of carbon fibers.

2. The carbon fiber composite material according to claim 1, wherein said average value X of Mn/Ln for said carbon fiber bundles is 1.5×10$^{-2}$≤X≤5.5×10$^{-2}$ (mg/mm).

3. The carbon fiber composite material according to claim 1, wherein a standard deviation σof a number of fibers x$_n$(=Mn/(Ln×F)) forming a bundle of said carbon fiber bundles (1) is 50≤σ≤400, wherein F: fineness of carbon fibers.

4. The carbon fiber composite material according to claim 1, wherein said carbon fiber bundles are formed from a carbon fiber bundle whose drape value/flexural stiffness (cm/(Pa·cm$^4$)) at 25° C. is 3.5×10$^3$ to 9.0×10$^3$ (cm/(Pa·cm$^4$)).

5. The carbon fiber composite material according to claim 1, wherein the fiber length of carbon fibers Ln in said carbon fiber bundles is 5 to 25 mm.

6. The carbon fiber composite material according to claim 1, wherein the proportion Y, relative to the total weight of carbon fibers, of said carbon fiber bundles is 40≤Y≤65 (wt %).

7. The carbon fiber composite material according to claim 1, wherein a single fiber flexural stiffness of carbon fibers forming said carbon fiber bundles is 1.0×10$^{-11}$ to 2.8×10$^{-11}$ (Pa·cm$^4$).

8. The carbon fiber composite material according to claim 1, wherein carbon fiber aggregates in said carbon fiber composite material comprise a carbon fiber non-woven fabric obtained by a carding process.

9. The carbon fiber composite material according to claim 1, wherein said carbon fiber composite material comprises a stampable sheet prepared by impregnating a thermoplastic resin into carbon fiber aggregates.

10. The carbon fiber composite material according to claim 2, wherein a standard deviation σof a number of fibers x$_n$ (=Mn/(Ln×F)) forming a bundle of said carbon fiber bundles (1) is 50≤σ≤400, wherein F: fineness of carbon fibers.

11. The carbon fiber composite material according to claim 2, wherein said carbon fiber bundles are formed from a carbon fiber bundle whose drape value/flexural stiffness (cm/(Pa·cm$^4$)) at 25° C. is 3.5×10$^3$ to 9.0×10$^3$ (cm/(Pa·cm$^4$)).

12. The carbon fiber composite material according to claim 3, wherein said carbon fiber bundles are formed from a carbon fiber bundle whose drape value/flexural stiffness (cm/(Pa·cm$^4$)) at 25° C. is 3.5×10$^3$ to 9.0×10$^3$ (cm/(Pa·cm$^4$)).

13. The carbon fiber composite material according to claim 2, wherein the fiber length of carbon fibers Ln in said carbon fiber bundles is 5 to 25 mm.

14. The carbon fiber composite material according to claim 3, wherein the fiber length of carbon fibers Ln in said carbon fiber bundles is 5 to 25 mm.

15. The carbon fiber composite material according to claim 4, wherein the fiber length of carbon fibers Ln in said carbon fiber bundles is 5 to 25 mm.

16. The carbon fiber composite material according to claim 2, wherein the proportion Y, relative to the total weight of carbon fibers, of said carbon fiber bundles is 40≤Y≤65 (wt %).

17. The carbon fiber composite material according to claim 3, wherein the proportion Y, relative to the total weight of carbon fibers, of said carbon fiber bundles is $40 \leq Y \leq 65$ (wt %).

18. The carbon fiber composite material according to claim 4, wherein the proportion Y, relative to the total weight of carbon fibers, of said carbon fiber bundles is $40 \leq Y \leq 65$ (wt %).

19. The carbon fiber composite material according to claim 5, wherein the proportion Y, relative to the total weight of carbon fibers, of said carbon fiber bundles is $40 \leq Y \leq 65$ (wt %).

20. The carbon fiber composite material according to claim 2, wherein a single fiber flexural stiffness of carbon fibers forming said carbon fiber bundles is $1.0 \times 10^{-11}$ to $2.8 \times 10^{-11}$ (Pa·cm$^4$).

* * * * *